United States Patent [19]

Impink, Jr. et al.

[11] Patent Number: 4,711,753
[45] Date of Patent: Dec. 8, 1987

[54] CALIBRATION OF A NUCLEAR REACTOR CORE PARAMETER PREDICTOR

[75] Inventors: Albert J. Impink, Jr., Murrysville; Toshio Morita, Wilkinsburg; Reno W. Miller, Penn Hills; Louis R. Grobmyer, North Huntingdon, all of Pa.

[73] Assignee: Westinghouse Electric Corp., Pittsburgh, Pa.

[21] Appl. No.: 841,498

[22] Filed: Mar. 19, 1986

[51] Int. Cl.$^4$ .............................. G21C 7/36
[52] U.S. Cl. ............................ 376/216; 376/215; 364/492
[58] Field of Search ............ 376/216, 215, 219; 364/140, 148, 550, 492

[56] References Cited

U.S. PATENT DOCUMENTS

| | | | |
|---|---|---|---|
| 4,016,034 | 4/1977 | Musick | 376/236 |
| 4,055,463 | 10/1977 | Torres | 376/236 |
| 4,057,463 | 11/1977 | Morita | 376/218 |
| 4,080,251 | 3/1978 | Musick | 376/236 |
| 4,299,657 | 11/1981 | Abenhaim et al. | |
| 4,552,718 | 11/1985 | Impink | 376/216 |
| 4,637,910 | 1/1987 | Impink | 376/216 |

FOREIGN PATENT DOCUMENTS 5224694 2/1977 Japan .
39795 3/1979 Japan .

OTHER PUBLICATIONS

Argonne National Laboratory National Energy Software Center: Compilation of Program Abstracts—7411 revised May 1979, cover pp. 241.1, 241.2.

Primary Examiner—Donald P. Walsh
Attorney, Agent, or Firm—Daniel C. Abeles

[57] ABSTRACT

A calibrator for a pressurized water reactor (PWR) core predictor utilizing a distribution expression for the transverse buckling factor, in a one dimensional diffusion model, which has coefficients correlated with overall neutron balance and with a set of power distribution characterization parameters including axial offset, axial pinch, axial quarters and axial fifths. The coefficients are periodically adjusted incrementally one at a time to produce criticality with the model at measured values of rod position, reactor power level, cold leg temperature and boron concentration until the power distribution characterization parameters calculated from a power distribution generated by the model are within preset tolerances of those from a power distribution measurement generated by movable, or if provided, fixed, incore detectors.

25 Claims, 3 Drawing Figures

CALIBRATION OF A NUCLEAR REACTOR CORE PARAMETER PREDICTOR

CROSS REFERENCE TO RELATED APPLICATION

Commonly owned U.S. patent application Ser. No. 635,373 filed on July 27, 1984 in the name of Albert J. Impink, Jr. and entitled "Anticipatory Control of Xenon in a Pressurized Water Reactor", now U.S. Pat. No. 4,642,213

BACKGROUND OF THE INVENTION

1. Field of the Invention

This invention relates to apparatus and a method for calibrating an on-line predictor of the performance of the core of a nuclear reactor and more particularly to such a method and apparatus for periodically updating axially dependent transverse buckling factors used in a one dimensional neutron diffusion theory model of the core of a pressurized water reactor (PWR).

2. Prior Art

A number of attempts have been made by various groups over the past two or three decades to develop a reactor core response predictor that would serve as an aid to nuclear plant operators in various operations involving change of state of the reactor core. Typical applications of such a predictor would include: assessing the core shutdown margin when the reactor is subcritical, estimating at what point in a startup operation criticality would occur, identifying the most rapid or least water consuming route to follow in a power increase or other maneuver, determining the maximum power level attainable (i.e., the maximum spinning reserve obtainable) when the plant is at a reduced power level, evaluating the closeness of approach to an operating limit during a maneuver, and so on.

In order to simplify the calculations that would have to be done if a practical core response predictor were to be used, the three dimensional, multi-energy group, diffusion theory model of a typical PWR core has been modified to a one dimensional (axial), two energy group diffusion theory representation, for which the computational resource requirements fall within the capability of typical on-site plant digital computers. In the process of reducing the three dimensional core model to a one dimensional model, account had to be taken of the flow in the x-y, or transverse, sense of neutrons from regions of high multiplication potential to regions of lower multiplication potential, and ultimately from the core to the surrounding media. According to the basic precepts of neutron diffusion theory, this transverse flow of neutrons can be accounted for by the inclusion of a transverse buckling term in the overall neutron balance equations, and this has been the standard practice for a number of years by specialists in PWR core design in predicting reactor core responses.

A significant source of error that exists when a simplified one dimensional diffusion theory model is used in lieu of the more nearly valid three dimensional model lies in the choice of the value of the transverse buckling term to be incorporated into the one dimensional model. It has been common practice to use a single value for the transverse buckling at all core elevations in the one dimensional axial model. For PWR cores characterized by high uniformity in nuclear properties in the axial direction, this approach is acceptable. However, for those PWR cores that shows significant variation in nuclear properties at different axial elevations, as a result either of core depletion due to prolonged operation at power or optimized fuel loading designs that seek to improve the commercial aspects of the core loading, the use of a single transverse buckling value that is constant over core height leads to unacceptable errors in the calculated values of both core reactivity and core axial power distribution.

Additional difficulties arise if the initial conditions, especially the core average axial distributions of iodine-135, xenon-135 and local fuel burnup, supplied to the predictor do not faithfully reproduce actual core conditions when the predictor is initialized. Accurate reproduction of the xenon-135 axial distribution is particularly important since the xenon-135 nucleus has a very high cross-section for neutron absorption and so strongly affects both core reactivity and core power distribution. The xenon-135 has a half life of several hours and most of it is not produced directly from fission of the uranium fuel, but through decay of an intermediate fission product, iodine-135. The distribution of power throughout the core depends upon the distribution of xenon, which in turn, depends upon the recent distribution of power. Thus, the response of a core to proposed changes in operating conditions is a function not only of its present condition, but also its recent past.

Diffusion theory equations have been developed and used for many years to analyze core performance. They are three-dimensional, multi-energy group, partial differential equations which characterize the movement of neutrons throughout the core. Such equations are time consuming to set up and require a great deal of computer capacity and time to solve. Hence, this approach is used mainly, and only to a limited degree, for analysis during the design phase and when sufficient lead time is available to set up and solve the three dimesional equations.

For some time, two of the present inventors have used a one dimensional diffusion theory model of a reactor core with transverse buckling factors which are a function of core height. While this model uses axial offset, which is a well known characterization of power which can be in determining the coefficients for the functions selected for the particular buckling factor distribution employed, it also requires the use of the second derivative of the flux distribution at the top and bottom nodes of the core. These data cannot be measured with the necessary accuracy by practical means. Hence, this model is useful in making analytical predictions, such as those made during the design phase, but it is not suitable for an on-line predictor which should be calibrated periodically using operating plant data in order to generate meaningful predictions.

In fact, presently available core predictors have proven to be not satisfactory, due in large part to failure to provide a convenient method for adjusting the core model used by the predictor to adequately reflect actual core characteristics as core depletion progresses. It is recognized that in some more recent attempts, such as an ongoing Electric Power Research Institute (EPRI) sponsored program, to develop usable and effective predictors, reasonable and apparently acceptable degrees of success have been reported when a three dimensional, multigroup, nodal computation scheme has been used in connection with signals from an array of fixed incore neutron or gamma ray detectors permanently installed in the core. Unfortunately, the costs of both the computer and the incore instrumentation required to support this approach tend to be undesirably high. In addition, such three dimensional models are not suitable for predictors used in plant protection or control systems, due to the length of time required to generate a prediction.

Japanese Patent Publication No. 1979-39795, published on Mar. 27, 1979 suggests an on-line predictor for a boiling water reactor (BWR) based upon a one dimensional diffusion model which utilizes incore neutron detectors. It appears that realistic initial conditions are generated by periodically calculating the xenon distribution. It also appears that height dependent radial buckling factors are determined analytically by rearranging the simplified diffusion equation, and that these buckling factors are adjusted analytically for changes in moderator density from initial conditions. However, there is no indication that the buckling factors are adjusted to agree with actual conditions. In other words, there is no indication that the one dimensional model used is ever calibrated using operating plant data to bring it closer to the actual state of the reactor core.

U.S. Pat. No. 4,299,657 suggests a simplified diffusion model for an on-line core predictor, however, there is no indication at all as to what this model is. This patent also suggests that some parameters calculated by the predictor can also be measured, and that periodically the calculated values should be replaced by the measured values. This would suggest periodic reinitialization of the calculations, but there is no suggestion that it would be desirable to, let alone as to how to, calibrate the model to adjust it to changing conditions in the core.

It is a primary object of the present invention to provide a reactor core predictor which provides accurate real time predictions of core performance.

It is another object of the invention to achieve the primary object utilizing a one dimensional, few group diffusion theory model.

It is yet another object of the invention to satisfy the above objects by providing a method and apparatus for periodically calibrating the one dimensional diffusion theory model to adjust the model to represent more closely the actual condition of the reactor core.

It is still another object to achieve this latter object by utilizing height dependent transverse buckling factors which can be reliably adjusted through use of measured parameters.

SUMMARY OF THE INVENTION

These and other objects are realized by the present invention which provides a technique for adjusting the buckling factor in the one dimensional diffusion theory core model for a pressurized water reactor using measurable parameters, such that the model may be accurately updated to reflect the true condition of the core. In particular, a distribution expression selected for the transverse buckling factor has coefficients which are correlated with overall neutron balance in the core, and with power distribution. The buckling expression coefficients are adjusted incrementally in succession, until the overall neutron balance and power distribution generated by the one dimensional diffusion theory core model, using the selected transverse buckling distribution expression, agree within preset tolerances with an independently measured reference power distribution, and with the overall neutron balance at core conditions represented by the measured values of a set of controllable parameters which influence the overall neutron balance. Such parameters include control rod position, reactor power level, cold leg temperature and reactor coolant boron concentration. Since these parameters, and the power distribution may be measured, the latter by a movable or fixed incore detector system, the model can be accurately calibrated to compensate for changes which occur over the life of the core.

We have developed a distribution expression for the transverse buckling factor which has one coefficient correlated with the overall neutron balance and several which correlate with certain power distribution characterization parameters. Periodically, the coefficients are recalculated successively, one at a time, by selecting a value for one of the coefficients correlated with the power distribution. With the values of the other power distribution coefficients fixed, and the coefficient correlated with overall neutron balance set at zero, the transverse buckling distribution is calculated using the distribution expression. The value of the coefficient correlated with overall neutron balance is then adjusted to obtain criticality of the core with the one dimensional diffusion theory core model, using the calculated buckling distribution, at the measured values of the set of controllable parameters. A calculated value of the power distribution characterization parameter correlated with the selected coefficient is extracted from a calculated power distribution generated by the one dimensional diffusion theory core model. This calculated value is compared with the reference value of the power distribution characterization parameter. The selected value of the coefficient is revised and the above steps are repeated until the calculated and reference values of the parameter agree within preset tolerances. The same procedure is followed for each of the other coefficients correlated with power distribution, with the values of the previously calculated power distribution coefficients held fixed at their adjusted values. With the distribution expression we have developed, the coefficients correlated with power distribution are relatively independent, however, refined values for the coefficients can be obtained by repeating the entire sequence several times.

The power distribution characterization parameters which are derived from the measured power distribution and from the power distribution generated from the one dimensional diffusion theory core model include the well-known axial offset, which relates the power in the top and bottom halves of the core, and axial pinch, axial quarters and axial fifths which relate the power in vertical thirds, quarters and fifths of the core, respectively. The fact that these parameters and the parameters related to overall neutron balance are measurable, or at least directly derived from measured parameters, is what makes it possible with this invention to accurately calibrate an on-line core predictor which employs a one dimensional diffusion theory core model.

The present invention embraces both the method and apparatus for calibrating the one dimensional diffusion theory core model of an on-line core predictor.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

Figure 1:
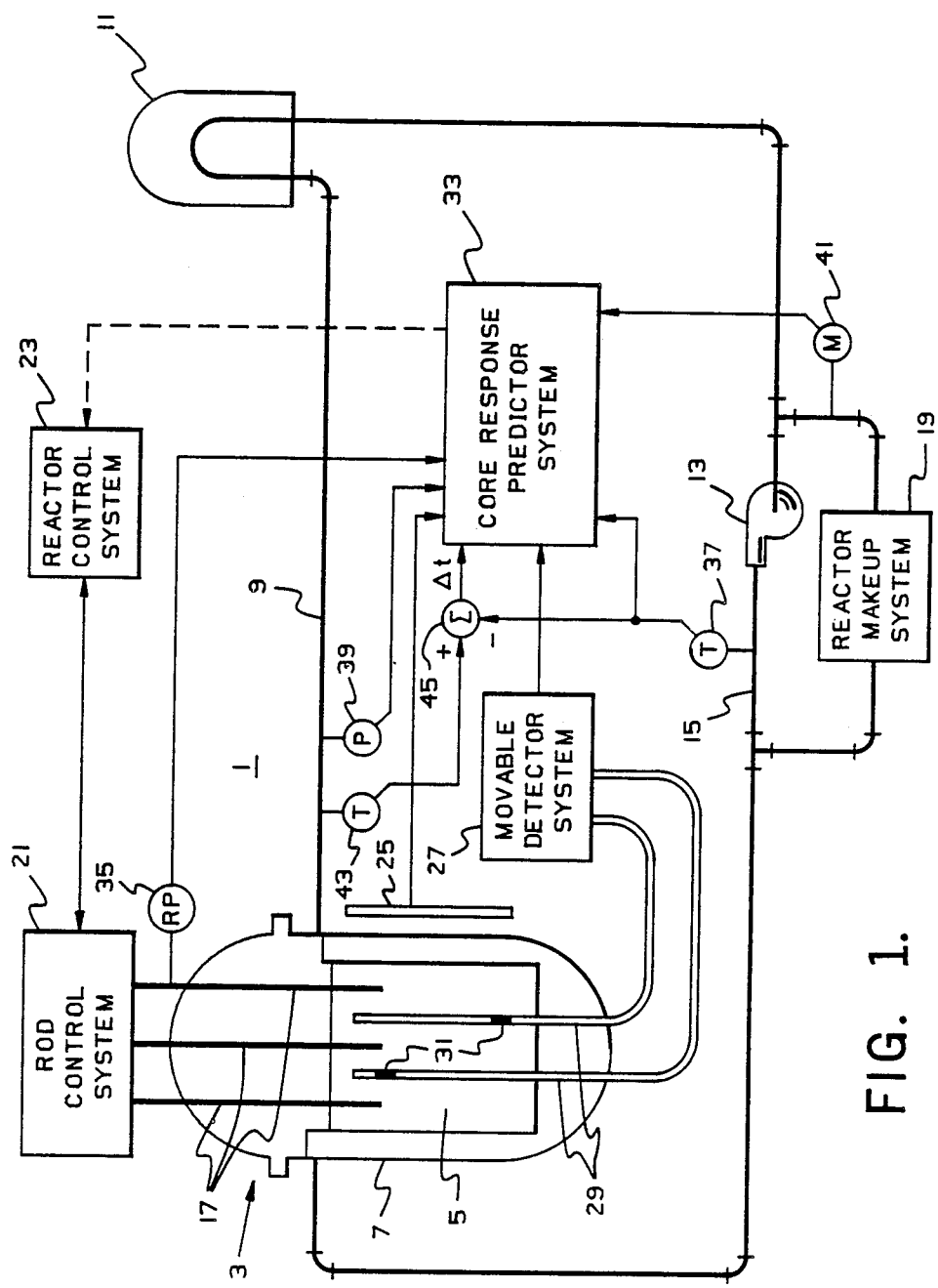
FIG. 1 is a schematic diagram of a pressurized water reactor (PWR) incorporating the invention.

The invention will be described as applied to a pressurized water reactor (PWR) for generating electric power. As shown in FIG. 1, the PWR 1 includes a reactor 3 which comprises a reactor core 5 housed inside a reactor vessel 7. Fission reactions within the core 5 generate heat which is absorbed by a reactor coolant, light water, which is passed through the core. The heated coolant is circulated through a hot leg 9 to a steam generator 11 where the heat is utilized to generate steam which drives a turbine-generator (not shown) to produce electric power. The cooled reactor coolant is returned to the reactor 3 by a reactor coolant pump 13 through a cold leg 15. While only one steam generator is shown in FIG. 1 for clarity, the typical PWR has two to four steam generators, all supplying steam to a single turbine-generator.

The reactivity of the reactor core 5 is controlled by dissolving a neutron absorber, such as boron, in the reactor coolant, and by the insertion into the core of control rods 17. The boron concentration of the reactor coolant is regulated by a reactor makeup system 19 which extracts coolant from the cold leg 15 upstream of the reactor coolant pump 13, adds or removes boron as appropriate, and returns the coolant with the proper boron concentration to the cold leg 15 downstream of the pump 13. The control rods 17, which are made of neutron absorbing material, are inserted into and withdrawn from the reactor core 5 by a rod control system 21. The rod control system 21 receives commands from the reactor control system 23.

Excore neutron detectors 25 monitor the neutron flux, and therefore the power level of the reactor 3. In addition, most PWRs are provided with a movable incore neutron detector system 27 which includes a number of thimbles 29 distributed across the core 5 through which movable detectors 31 may be inserted to generate a detailed map of power distribution in the core. Such mapping is performed periodically, such as monthly, to determine if there are any potential or actual limiting hot spots in the core.

Some PWRs are provided with a fixed incore detector system in which strings of detectors are permanently positioned in thimbles similar to the thimbles 29. These installations do not require the movable incore detector system, but they are very expensive and hence not universally used.

The present invention is directed to a core response predictor 33 which makes various predictions on the performance of the reactor core as requested by the plant operator or as part of an automatic control or protection system. The predictor 33 gathers various plant information, such as the flux readings taken by the excore detectors 25, and the flux maps generated by the movable incore detector system 27, or when provided, the fixed incore detectors. The predictor 33 also uses the position of the control rods 17 within the core as indicated by rod position indicators 35, cold leg temperature as indicated by temperature sensor 37, reactor coolant system pressure as detected by pressure transducer 39, and the boron concentration in the reactor coolant as determined by a meter 41 or by sampling and chemical analysis. The temperature differential, $\Delta t$, between the hot leg temperature as determined by a sensor 43 and the cold leg temperature indicated by sensor 37, which is a measure of the power generated by the reactor, is also supplied to the predictor 33. Alternately, a measure of reactor power can be achieved via Nitrogen-16 (N-16) power measurements using the N-16 power meter (not widely used). The $\Delta t$ quantity is available from the reactor control system, but is shown as generated by a summer 45 in FIG. 1 for simplicity. Where the predictor is incorporated into an automatic control system, predictions generated by the predictor 33 are supplied to the reactor control system 23 as indicated by the dashed line in FIG. 1.

The core response predictor 33 employs a simplification, as explained below, of the following well-known diffusion theory equation which characterizes the movement of neutrons throughout the reactor core:

$$\frac{1}{\phi(x,y,z)} \nabla \cdot D(x,y,z) \nabla \phi(x,y,z) = \nu \Sigma_f(x,y,z) - \Sigma_a(x,y,z) \quad \text{(Eq. 1)}$$

where:
$\phi$ = neutron flux
$D$ = diffusion coefficient
$\nabla \cdot D \nabla$ = is a mathematical operator that represents the divergence of the neutron current at location $(x,y,z)$
$\nu$ = neutrons emitted per fission
$\Sigma_f$ = macroscopic fission cross section
$\Sigma_a$ = macroscopic absorption cross section.

For any given location in the core, the first term on the right side of the equation 1 represents the production of neutrons and the second term represents the destruction of neutrons so that the term on the left represents the diffusion of neutrons into or out of that location depending upon the magnitudes of the terms on the right hand side. It is customary in neutronics calculations for PWR's to replace the mathematical operator $\nabla \cdot D \nabla$ in Equation 1 with the simple Laplacian operator $D \nabla^2$ which can be reexpressed as $$D \nabla^2 = D \left( \frac{\partial^2}{\partial x^2} + \frac{\partial^2}{\partial y^2} + \frac{\partial^2}{\partial z^2} \right) \quad \text{(Eq. 2)}$$

Performing this replacement and substituting Equation 2 into Equation 1 and rearranging, we have $$\frac{1}{\phi(x,y,z)} D(x,y,z) \frac{\partial^2 \phi}{\partial z^2} = \nu \Sigma_f(x,y,z) - \Sigma_a(x,y,z) - \frac{1}{\phi(x,y,z)} D(x,y,z) \left[ \frac{\partial^2}{\partial x^2} + \frac{\partial^2}{\partial y^2} \right] \phi(x,y,z) \quad \text{(Eq. 3)}$$

In order to simplify Equation 3, and thus reduce the calculations required to predict, on line, core performance, the dependence of the various parameters on position in the transverse $(x,y)$ sense is neglected, and transversely averaged values of the parameters are substituted in the equation. Further, the transverse components of the Laplacian operator are replaced by a simple numerical, parameter $B_{xy}^2$, which is referred to as transverse buckling term, and which may or may not be a function of axial position, depending on the level of complexity and accuracy of the model employed. The resultant expression, including allowance for the axial variation of the transverse bucklings takes the form $$\frac{1}{\phi(z)} \frac{\partial^2}{\partial z^2} \phi(z) = \nu \overline{\Sigma}_f(z) - \overline{\Sigma}_a(z) - B_{xy}^2(z) \quad \text{(Eq. 4)}$$

Equation 4 is a one dimensional height dependent, diffusion theory equation in which the transverse buckling term is a factor which accounts for total neutron leakage in the x-y plane in place of a point by point determination of the transverse neutron balance.

The difficulty with the prior art one dimensional models is in selecting an expression for the buckling factor which provides the appropriate compensation, and which continues to do so as the core ages.

The goal is to identify that set of expansion coefficients in a transverse buckling distribution expression of the general form:

$$B_{xy}^2(z) = \sum_{z=1}^{I} A_i F_i(z) \quad \text{(Eq. 5)}$$

that yields the best attainable agreement between a core average axial power distribution calculated by the predictor 33 and the core average axial power distribution synthesized by the movable incore detector system 27 (or fixed incore detectors as appropriate), and between the critical boron concentration as calculated by the predictor 33 and the actual critical boron concentration measured by meter 41 or by sampling and chemical analysis.

We have found that the first few terms of a set of functions, $F_n(z)$, that are well suited for approximating the axial distribution of transverse buckling values $B_{xy}^2(z)$, have the form:

$$F_1(z) = 1$$

$$F_2(z) = \cos\frac{\pi z}{Z}$$

$$F_3(z) = \cos\frac{2\pi z}{Z} + \tfrac{1}{2}$$

$$F_4(z) = \cos\frac{3\pi z}{Z} + \cos\frac{\pi z}{Z}$$

$$F_5(z) = \cos\frac{4\pi z}{Z} + \cos\frac{2\pi z}{Z} + \tfrac{1}{2}$$

Additional terms could be added using the general recursion relationship:

$$F_n(z) = \cos\frac{(n-1)\pi z}{Z} + F_{n-2}(z)$$

where Z is the total height of core including extrapolation distances at the top and bottom, and z is the height of core, including the bottom extrapolation distance, at which the transverse buckling factor is being determined. Thus:

$$B_{xy}^2(z) = A_1(1) + A_2\cos\frac{\pi z}{Z} + A_3\left[\cos\frac{2\pi z}{Z} + \tfrac{1}{2}\right] +$$

$$A_4\left[\cos\frac{3\pi z}{Z} + \cos\frac{\pi z}{Z}\right] +$$

$$A_5\left[\cos\frac{4\pi z}{Z} + \cos\frac{2\pi z}{Z} + \tfrac{1}{2}\right] + \ldots A_n F_n(z) \ldots$$

We have also found that the coefficient $A_1$ is correlated with the neutron balance and hence is related to the core wide power, and that the remaining coefficients are correlated with the axial power distribution, or point wise power. More specifically, each of the coefficients $A_2$ through $A_5$ correlate with the following power distribution characterization parameters:

$A_2$ correlates with the axial offset AO
$A_3$ correlates with the axial pinch AP
$A_4$ correlates with axial quarters AQ
$A_5$ correlates with axial fifths AR
where:

$$AO = \frac{pwr\ top\ \tfrac{1}{2} - pwr\ bottom\ \tfrac{1}{2}}{pwr\ whole\ core.}$$

$$AP = \frac{pwr\ middle\ \tfrac{1}{2} - pwr\ top\ \tfrac{1}{4} - pwr\ bottom\ \tfrac{1}{4}}{pwr\ whole\ core.}$$

$$AQ = \frac{pwr\ top\ \tfrac{1}{4} - pwr\ 2nd\ \tfrac{1}{4} + pwr\ 3rd\ \tfrac{1}{4} - pwr\ 4th\ \tfrac{1}{4}}{pwr\ whole\ core.}$$

$$AR = \frac{pwr\ top\ 1/5 - pwr\ 2nd\ 1/5}{pwr\ whole\ core} +$$

$$\frac{pwr\ 3rd\ 1/5 - pwr\ 4th\ 1/5 + pwr\ bottom\ 1/5}{pwr\ whole\ core.}$$

The actual buckling search using flux map data consists in:

(1) Resolving the measured core average axial power distribution generated by the movable incore detector system 27 (or fixed incore detectors) into the set of typically four power distribution characterization parameters, AO, AP, AQ and AR.

(2) Establishing initial values for the coefficients $A_3$, $A_4$ and $A_5$. If the results of a prior calibration at an earlier stage in core burnup are available, those values are appropriate initial values for the present calibration. If no recent values of $A_3$, $A_4$ and $A_5$ are available, initial values of 0.0 are acceptable.

(3) Successively:
  (a) Making an initial guess of the value of $A_2$
  (b) Setting $A_1 = 0.0$
  (c) Using the guessed value of $A_2$, and the initial values of $A_3$, $A_4$ and $A_5$ to calculate the values of the transverse buckling axial distribution, $B_{x,y}^2(z)$.
  (d) Adjusting the value of the coefficient $A_1$, which is in fact the axially averaged transverse buckling value, to obtain criticality by inserting the transverse buckling distribution into the one dimensional diffusion theory equation (Equation 4) and generating therefrom a calculated axial power distribution, and then with this and the measured values of power level, control rod position, cold leg temperature, and boron concentration recorded concurrently with the reference flux map, determining the value of $A_1$ which produces a balance of neutron production and destruction over the entire core volume.
  (e) Extracting the axial offset $AO_c$ from the calculated power distribution.
  (f) Comparing the calculated axial offset $AO_c$ with the reference "measured" power distribution $AO_m$.

(g) Revising the guessed value of $A_2$ and repeating the sequence b through f until the difference between the compared AO values is less than a preset maximum acceptable value.

(4) Thereafter, the same process is repeated with $A_2$ fixed at the "best" value and a search made for that value of $A_3$ which minimizes the difference between the measured and calculated values of the AP parameter. The process is again repeated to evaluate $A_4$ on the basis of comparisons of the AQ parameter values, and finally, to evaluate $A_5$ using the AR values.

Experience has shown that it is usually desirable to make several iterations through steps 3 and 4, holding the values of the higher coefficients of the set at the values found in the previous iteration while the value of each coefficient is further refined.

Figure 2:
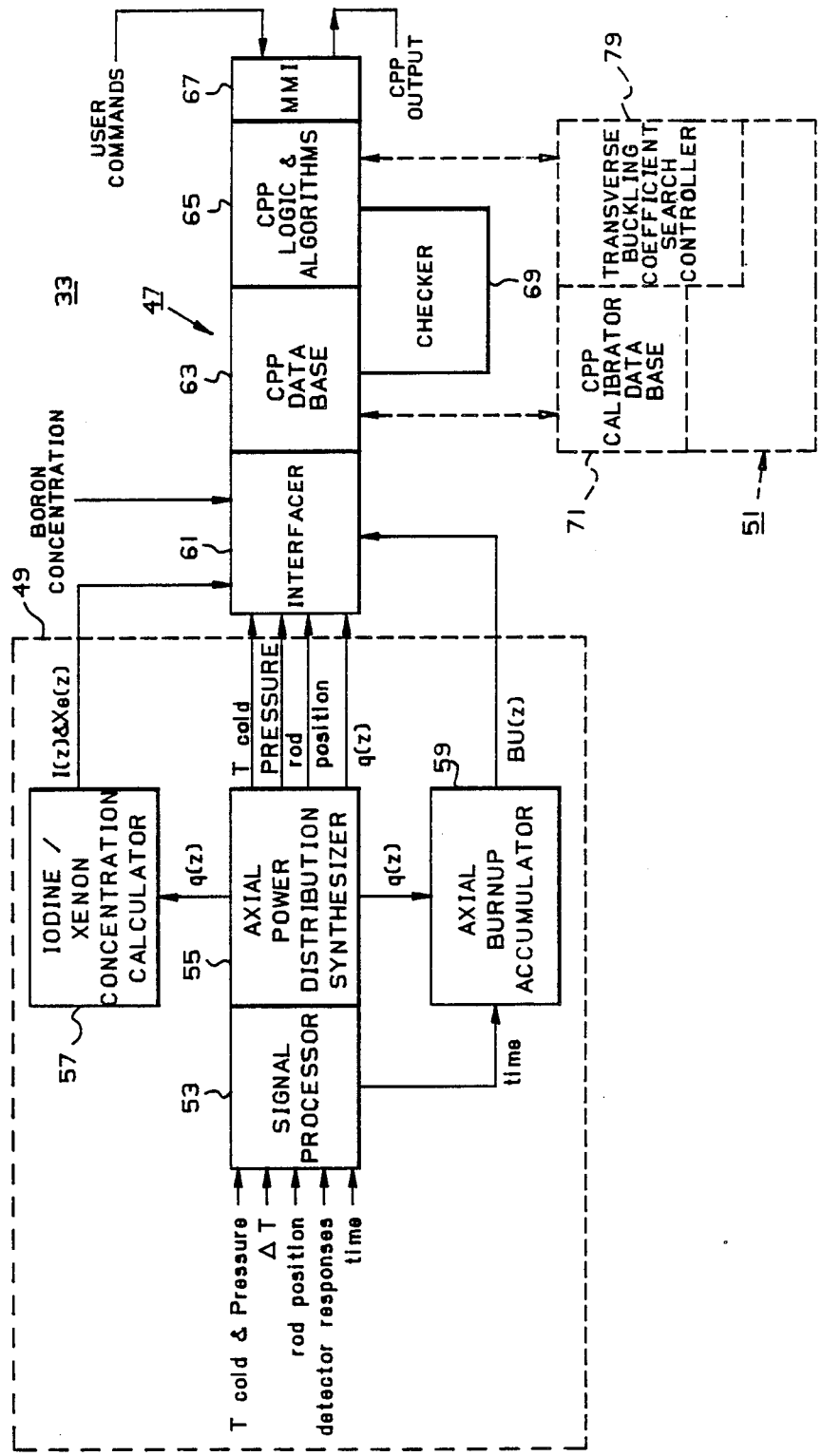
FIG. 2 is a functional diagram of a core parameter predictor which forms a part of the PWR shown in FIG. 1 and is adapted for the invention.

A block diagram of the functional configuration of the core parameter predictor system 33 incorporating a core predictor 47, initial condition updater 49 and the calibrator 51 is shown in FIG. 2. A conventional Signal Processor 53 conditions the input signals which include the cold leg temperature, reactor coolant pressure, temperature differential between the hot and cold legs $\Delta t$, rod position, the excore, or if appropriate incore, neutron detector responses, and time. An Axial Power Distribution Synthesizer 55 uses well-known methodology to generate frequently updated, reliable indications of the current core average axial power distribution, $g(z)$, from the neutron flux detector responses. An Iodine/Xenon Concentration calculator 57 uses the indications of core average axial power distribution, $q(z)$, to generate frequently updated indications of the current core average axial iodine-135 and xenon-135 concentration distributions, $I(z)$ and $Xe(z)$ respectively. U.S. Pat. No. 4,642,213 referred to above describes a technique for generating these distributions although they are used there for another purpose. An Axial Burnup Accumulator 59 accepts indications of core average axial power distribution, $q(z)$, from the synthesizer 55 and time from any convenient source, and generates frequently updated indications of the core average axial burnup distribution, $BU(z)$.

An Interfacer 61, which forms a part of the core predictor 47, accepts the processed plant data, primarily from the Signal Processor 53, and the several core average axial distribution data from the Axial Power Distribution Synthesizer 55, the Iodine and Xenon Concentration Calculator 57, and the Axial Burnup Accumulator 59 and converts them, as appropriate, into values whose units are suitable for nuclear reactor calculations. For example, the preferred algorithms used by the calculator 57 yield iodine and xenon concentrations in scaled units. The Interfacer 61 uses multiplier values originally generated, and periodically updated, by the core parameter predictor calibrator, CPP Calibrator 51, described below, to convert the scaled iodine and xenon concentration values into best estimates in the atoms per cubic centimeter form conventionally used.

Boron concentration information is received directly by the Interfacer 61 in nuclear reactor evaluations. The Interfacer 61 also accesses the core parameter predictor data base, CPP Data Base 63, and stores the various converted values in computer memory.

. The CPP Data Base 63 is a collection of the various necessary data, including:

(1) frequently updated initial conditions data passed through the Interfacer 61, (2) cycle dependent nuclear cross sections, core descriptions and physical constants supplied originally by the core nuclear designer; and (3) the periodically updated transverse buckling parameters generated by the CPP Calibrator 51, stored in the computer memory and utilized in the actual predictive calculations carried out by the core parameter predictor CPP 47. The CPP Data Base exchanges data with the Calibrator Data Base 71.

The heart of the core parameter predictor 47 is a set of computational algorithms and computation control logic 65 embodied in computer software and a set of interactive instructions (man-machine interface) MMI 67 to facilitate communications with the human user or with another computer software package such as might be embodied in the Reactor Control System 23. The functions of the core parameter predictor 47 are: to accept instructions from the user regarding what predictions are to be made through MMI 67, to utilize its computational algorithms 65 and data base 63 to perform the necessary calculations, and to report the results to the user, either man or machine, again through MMI 67. The basic methodology incorporated in 65 is well-known. Computer codes embodying all the necessary functions are available. A suitable code utilizing a one dimensional diffusion theory core model is available from the National Energy Software Center run by the Argonne National Laboratory, Argonne, Ill. and is identified in their Compilation of Program Abstracts, ANL-7411 Revised, dated May 1979 under the designation HFN and is described in NESC Abstract 241. The distribution expression described above with its coefficients $A_1$ to $A_5$ can be utilized as the buckling parameter in this model. The CCP Logic and Algorithm package 65 communicates with a Transverse Buckling Coefficient Search controller 79 in the calibrator 51.

The CPP 47 also includes a Checker 69 which accepts core average axial power distribution data from the synthesizer 55, and current reactor coolant system boron concentration information, if available in sufficiently reliable form, from the Signal Processor 53, and compares these data with equivalent information generated by the predictor with the algorithms 65. The comparison is made immediately after actuation of the CPP 47 as a check on both the validity of the input initial condition data and the accuracy of the initial calculations performed by the algorithms 65. In the event that acceptable agreement is not found by the Checker 69, messages indicating the unreliability of any results generated by 65 are transmitted to the user and CPP operations by 65 are inhibited.

The Initial Conditions Updater 49 and its supporting components are expected to function under both steady state and normal transient operating conditions. Update frequency is expected to be approximately one update every five minutes under normal transient conditions and approximately one update every fifteen minutes under base load, steady state conditions.

Figure 3:
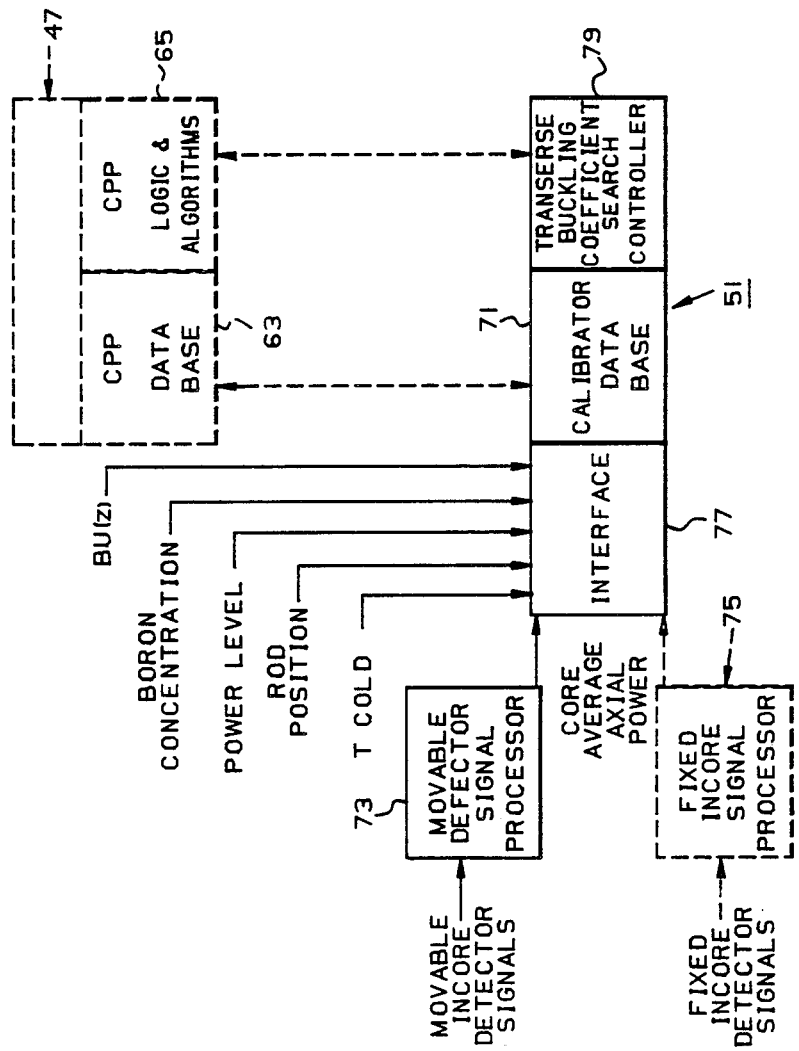
FIG. 3 is a functional diagram of a calibrator in accordance with the teachings of the invention for the core parameter predictor of FIG. 2.

The functional configuration of the Core Parameter Predictor (CPP) Calibrator 51 is shown in block diagram form in FIG. 3. The movable Detector Signal Processor 73 accepts data from the Movable Detector System 27 during the periodic flux mapping operations and generates a detailed core average axial power distribution. Appropriate computer codes for carrying out this function are in common use in PWR installations. Alternatively a Fixed Incore Signal Processor 75 accepts signals generated by the strings of fixed incore neutron or gamma ray detectors, when provided, and generates a detailed core average axial power distribution. This alternative is only applicable in those PWR installations equipped with a full compliment of fixed incore detectors.

An interfacer 77 in the CPP calibrator 51 accepts the core average axial power distribution generated by 73 or 75 when appropriate, together with certain data received from the Initial Conditions Updater 49, and inserts these data into the CPP Calibrator Data Base 71. The data received from the Initial Conditions Updater 49 include rod position, cold leg temperature and power level supplied by the Signal Processor 53, an axial burnup distribution generated by accumulator 59 at the time of the flux map data processed by 73 or 75, and an accurate concurrent value for the boron concentration generated by the meter 41 or by chemical analysis. The Calibrator Data Base 71 shares the nuclear constants part of the CPP Data Base 63 to insure commonality in calculations.

The transverse buckling coefficient search controller 79 uses a predefined logical sequence to establish the order in which the transverse buckling coefficient values are considered and to select successive values of the appropriate transverse buckling coefficient. The selection process consists in choosing an initial value of the appropriate coefficient, passing the selected value to its data base 71 and thence to the CPP Data Base 63, and initiating in the CPP Logic and Algorithms 65, a criticality search, wherein the value of the core average transverse buckling, $A_1$, in the transverse buckling expression, is adjusted to obtain an overall neutron balance within a preselected tolerance. The resulting core average axial power distribution is returned from the CPP Logic and Algorithms 65 to the search controller 79 where the calculated core average axial power distribution is resolved into the set of characterization parameters, AO, AP, AQ, etc. and the value of the appropriate parameter corresponding to the buckling coefficient being considered is compared to the reference value derived from the measured power distribution and stored in database 71. If the calculated and reference values of the appropriate power distribution characterization parameter agree within a preset tolerance, the selected value of the buckling coefficient is stored in the two databases 71 and 63 for subsequent use by the predictor 47 and the search controller passes to the next buckling coefficient. If the values do not agree within a preset tolerance, the logic of the search controller is activated to select a better value of the buckling coefficient in question and the process of storing the new value, initiating a critically search and testing the results of the criticality search is repeated. This periodic calibration of the predictor, together with resetting of the initial conditions, assure that the predictions remain valid over the life of the core.

The Core Parameter Predictor Calibrator 51 and its supporting components are expected to function only when supplied with data obtained under equilibrium, steady state conditions. Normal calibration frequency is expected to be no more than once each equivalent full power month of plant operation.

While specific embodiments of the invention have been described in detail, it will be appreciated by those skilled in the art that various modifications and alternatives to those details could be develoed in light of the overall teachings of the disclosure. Accordingly, the particular arrangements disclosed are meant to be illustrative only and not limiting as the scope of the invention which is to be given the full breadth of the appended claims and any and all equivalents thereof.

What is claimed is:

1. A method of calibrating, for neutron balance and power distribution, an on-line nuclear reactor core performance predictor which utilizes a one dimensional diffusion theroy core model incorporating elevation dependent neutronics parameters including macroscopic cross-sections, diffusion coefficients and transverse buckling factors, said method comprising the steps of: periodically adjusting the buckling factors by:
   measuring the power distribution with the core in equilibrium at power;
   concurrently measuring a set of controllable parameters which influence overall neutron balance in the core;
   selecting a distribution expression for the elevation dependent transverse buckling factors having expansion coefficients which include a coefficient correlated to the overall neutron balance and the remainder correlated to power distribution; and
   adjusting said expansion coefficients such that the overall neutron balance and power distribution generated by said one dimensional diffusion theory core model, using said selected transverse buckling distribution expression, agree within preset tolerances with the measured power distribution and the overall neutron balance for actual core conditions represented by the measured values of said set of controllable parameters.

2. The method of claim 1 including the step of resolving the measured power distribution into a set of measured power distribution characterization parameters and wherein said step of selecting a distribution expression for the height dependent transverse buckling factors comprises selecting a distribution expression having, in addition to the coefficient which correlates with overall neutron balance, power distribution related coefficients which correlate with each of said power distribution characterization parameters, and wherein said step of adjusting the expansion coefficients includes successively, iteratively, incrementally adjusting said power distribution related coefficients until calculated power distribution characterization parameters resolved from the power distribution calculated by said one dimensional diffusion theory core model using said coefficients are each within present tolerances of the correlated measured power distribution characterization parameter.

3. The method of claim 2 wherein the expansion coefficient correlated with overall neutron balance is adjusted to obtain criticality with the one dimensional diffusion theory core model at the measured values of said set of controllable parameters.

4. The method of claim 2 wherein each power distribution related coefficient is adjusted separately in succession by:
   (a) selecting a value for the power distribution related coefficient;
   (b) setting the coefficient correlated with the overall neutron balance equal to zero;
   (c) calculating the buckling factor using the selected value of the power distribution coefficient, and a fixed value for the other power distribution related coefficients;
   (d) adjusting the value of the coefficient correlated with overall neutron balance to obtain criticality of the core with the one dimensional diffusion theory core model using the calculated buckling factor, at the measured values of said set of controllable parameters;

(e) extracting a calculated value of the correlated power distribution characterization parameter from a calculated power distribution generated by the diffusion theory core model;

(f) comparing the calculated power distribution characterization parameter with the correlated measured power distribution characterization parameter; and (g) revising the selected value of the power distribution related coefficient and repeating the steps (b) through (f) above until the difference between the calculated and measured values of the power distribution characterization parameter is less than a preset maximum acceptable value.

5. The method of claim 4 wherein the value of a power distribution related coefficient remains fixed at its adjusted value while the other power distribution related coefficients are adjusted.

6. The method of claim 5 including, after all of the power distribution related coefficients have been adjusted, readjusting each of the power distribution related coefficients, and in the process the coefficient correlated with overall neutron balance, again by repeating the steps of claim 5 at least once more.

7. The method of claim 6 wherein the step of measuring a set of controllable parameters which influence the overall neutron balance, includes measuring: control rod position, reactor power level, cold leg temperature, and boron concentration.

8. The method of claim 7 wherein the step of resolving the measured power distribution into a set of measured power distribution characterization parameters comprises resolving axial offset, axial pinch, axial quarters, and axial fifths characterizations from the measured power distribution, wherein said distribution expression is selected such that said power distribution coefficients are correlated with this set of characterizations and wherein said calculated power distribution characterizations comprise corresponding characterizations.

9. The method of claim 8 wherein said power distribution related coefficients are adjusted successively in the order set forth in claim 8 beginning with the coefficient correlated with the axial offset.

10. The method of claim 2 wherein the step of measuring said power distribution comprises measuring a three-dimensional power distribution using a movable incore detector system and resolving therefrom a core average axial power distribution.

11. The method of claim 2 wherein the step of measuring said power distribution comprises measuring a three-dimensional power distribution using fixed incore detectors and resolving therefrom a core average axial power distribution.

12. A method of calibrating, for neutron balance and power distribution, an on-line nuclear reactor core performance predictor which utilizes a one dimensional diffusion theory core model incorporating elevation dependent neutronics parameters including macroscopic cross-sections, diffusion coefficients and transverse buckling factors, said method comprising the steps of: periodically adjusting the buckling factor by: measuring the power distribution with the core in equilibrium at power and generating therefrom a reference axial offset parameter;

concurrently measuring reactor power level, control rod position, cold leg temperature, and boron concentration;

selecting a distribution expression for the elevation dependent transverse buckling factor having expansion coefficients which include a coefficient correlated to the overall neutron balance in the core and a coefficient correlated to the axial offset; and adjusting said expansion coefficients by:
(a) selecting a value for the coefficient correlated with axial offset;
(b) setting the coefficient correlated with the overall neutron balance equal to zero;
(c) calculating the buckling factor using the selected value of the coefficient correlated with axial offset;
(d) adjusting the value of the coefficient correlated with the overall neutron balance to obtain criticality of the core with the one dimensional diffusion theory core model, using the calculated buckling factor, at the measured values of reactor power level, control rod position, cold leg temperature and boron concentration;
(e) extracting a calculated value of axial offset from a calculated core average axial power distribution generated by the diffusion theory core model;
(f) comparing the calculated axial offset with the reference axial offset; and
(g) revising the value for the coefficient correlated with axial offset and repeating the steps (b) through (f) above until the difference between the values of the calculated and reference axial offset is less than a preset maximum acceptable value.

13. The method of claim 12 wherein the step of selecting a distribution expression for the elevation dependent transverse buckling factor $B_{xy}^2(z)$, comprises selecting the following expression:

$$B_{xy}^2(z) = A_1 + A_2 \cos\frac{\pi z}{Z}$$

where:
$A_1$ is the coefficient correlated with overall neutron balance and $A_2$ is the coefficient correlated with axial offset, z is the total height of the core, including an extrapolation distance at the top and bottom of the core, and z is the point in the height of the core, including the bottom extrapolation distance at which the transverse buckling factor is being determined.

14. The method of claim 12 including: generating a value for an axial pinch parameter from the measured core average axial power distribution, selecting a distribution expression for the elevation dependent transverse buckling factor which also includes a coefficient correlated with the axial pinch parameter, and adjusting said coefficient correlated with axial pinch by repeating the steps (a) through (g) of claim 12 for the axial pinch parameter while maintaining the coefficient correlated with axial offset fixed at the adjusted value.

15. The method of claim 14 including repeating the steps (a) through (g) of claim 12 again separately for both the coefficient correlated with axial offset and the coefficient correlated with axial pinch.

16. The method of claim 14 wherein the step of selecting a distribution expression for the elevation dependent transverse buckling factor $B_{xy}^2(z)$ comprises selecting the following expression:

$$B_{xy}^2(z) = A_1 + A_2\cos\frac{\pi z}{Z} + A_3\left[\cos\frac{2\pi z}{Z} + \frac{1}{2}\right]$$

where:
A$_1$ is the coefficient correlated with overall neutron balance, A$_2$ is the coefficient correlated with axial offset, A$_3$ is the coefficient correlated with axial pinch, Z is the total height of the core including an extrapolation distance at the top and bottom of the core, and z is the point in the height of the core including the extrapolation distance at the bottom of the core at which the transverse buckling factor is being determined.

17. The method of claim 14 including: generating a value for an axial fifths parameter from the measured core average axial power distribution, selecting a distribution expression for the elevation dependent transverse buckling factor which also includes a coefficient correlated with the axial fifths parameter, and adjusting the coefficient correlated with the axial fifths parameter by repeating the steps (a) through g) of claim 12 for the axial fifths parameter while maintaining the coefficients correlated with axial offset and axial pinch at the adjusted values.

18. The method of claim 17 including: generating a value for an axial quarters parameter from the measured core average axial power distribution, selecting a distribution expression for the elevation dependent transverse buckling factor which also includes a coefficient correlated with the axial quarters parameter, and adjusting the coefficient correlated with the axial quarters parameter, prior to adjusting the coefficient correlated with axial fifths, by repeating the steps a) through g) of claim 12 for the axial quarters parameter while maintaining the coefficients correlated with axial offset and axial pinch fixed at their adjusted value, and the coefficient correlated with the axial fifths parameter fixed at a selected value.

19. The method of claim 18 including repeating the steps (a) through (g) of claim 12 again separately, in order, for each of said coefficients correlated with axial offset, axial pinch, axial quarters and axial fifths.

20. A method of calibrating, for neutron balance and core average axial power distribution, an on-line nuclear reactor core performance predictor which utilizes a one dimensional diffusion theory core model incorporating elevation dependent neutronics parameters including macroscopic cross-sections, diffusion coefficients and transverse buckling factors, said method comprising the steps of: periodically adjusting the buckling factor by:
measuring the core average axial power distribution with the core in equilibrium at power and generating therefrom reference power distribution characterization parameters comprising: axial offset, axial pinch, axial quarters and axial fifths;
concurrently measuring reactor power level, control rod position, cold leg temperature, and boron concentration;
selecting the following distribution expression for the elevation dependent transverse buckling factor:

$$B_{xy}^2(z) = A_1 + A_2\cos\frac{\pi z}{Z} + A_3\left[\cos\frac{2\pi z}{Z} + \frac{1}{2}\right] +$$

$$A_4\left[\cos\frac{3\pi z}{Z} + \cos\frac{\pi z}{Z}\right] +$$

$$A_5\left[\cos\frac{4\pi z}{Z} + \cos\frac{2\pi z}{Z} + \frac{1}{2}\right]$$

where:
$B_{xy}^2(z)$ is the transverse buckling factor, A$_1$ is an expansion coefficient correlated with overall neutron balance and A$_2$ through A$_5$ are expansion coefficients correlated with the power distribution characterization parameters, with A$_2$ correlated with axial offset, A$_3$ correlated with axial pinch, A$_4$ correlated with axial quarters, and A$_5$ correlated with axial fifths; Z is the total height of the core including extrapolation distances at top and bottom, and z is the point in the height of the core including the bottom extrapolation distance at which the transverse buckling factor is being determined, and
adjusting the values of the expansion coefficients in the selected distribution expression by:
successively, in the order A$_2$ through A$_5$, selecting one of said expansion coefficients correlated with a power distribution characterization parameter while holding the values of the other such coefficients fixed; and
(a) selecting a value for the selected coefficient;
(b) setting the coefficient correlated with the overall neutron balance equal to zero;
(c) calculating the buckling factor using the selected expression, the selected value of the selected coefficient, and said fixed values of the other coefficients correlated with the power distribution characterization parameters;
(d) adjusting the values of the coefficient correlated with the overall neutron balance to obtain criticality of the core with the one dimensional diffusion theory core model, using the calculated buckling factor at the measured values of reactor power level, control rod position, cold leg temperature, and boron concentration;
(e) extracting a calculated value of the power distribution characterization parameter with which the selected coefficient is correlated from a core average axial calculated power distribution generated by the diffusion theory core model;
(f) comparing the calculated power distribution characterization parameter with the reference value; and
(g) revising the value of the selected coefficient and repeating the steps (b) through (f) above until the difference between the calculated and reference values of the power distribution characterization parameter correlated with the selected coefficient is less than a maximum acceptable value.

21. A nuclear reactor system comprising:
a reactor having a reactor core;
means for periodically measuring power distribution in the core;

means for concurrently measuring a set of controllable parameters which influence the overall neutron balance of the core; and a digital computer programmed to predict reactor core performance using a one dimensional diffusion theory core model incorporating elevation dependent neutronics parameters including macroscopic cross-sections, diffusion coefficients and transverse buckling factors, and to periodically calibrate the one dimensional diffusion theory core model through adjustment of the transverse buckling factors, by adjusting the coefficients of a buckling factor distribution expression such that the overall neutron balance and power distribution generated by said one dimensional diffusion theory core model using said transverse buckling factor distribution expression, agree within preset tolerances with said measured power distribution and the overall neutron balance for the core conditions indicated by the measured values of said set of controllable parameters.

22. The system of claim 21 wherein said reactor includes: control rods insertable in the core for controlling reactivity, means for controlling the concentration of boron in reactor coolant circulated through the core, and a cold leg through which reactor coolant is introduced into the core, and wherein said means for measuring a set of controllable parameters which influence overall neutron balance include: means for measuring control rod position, means for generating a measurement of boron concentration in the reactor coolant, means for measuring the temperature of reactor coolant in said cold leg and means for measuring the power level of the reactor core.

23. The system of claim 22 wherein said means for measuring the power distribution in the core comprises a movable incore detector system.

24. The system of claim 22 wherein said means for measuring the power distribution in the core comprises a fixed incore detector system.

25. A calibratable core performance predictor for a nuclear reactor having a reactor core, control rods for controlling the reactivity of the reactor core, and means for controlling the boron concentration of reactor coolant circulated through the core, said predictor comprising:

means for measuring the position of the control rods in the reactor core;

means for measuring the boron concentration of the reactor coolant;

means for measuring the temperature of the reactor coolant entering the core;

means for measuring the power level of the reactor;

means for periodically measuring the core average axial power distribution in the core; and digital computer means programmed to generate predictions of reactor core performance using a one dimensional diffusion theory core model incorporating elevation dependent neutronics parameters including macroscopic cross-sections, diffusion coefficients and transverse buckling factors, and to periodically calibrate the one dimensional diffusion theory core model through adjustment of the transverse buckling factors, by adjusting the coefficients of a transverse buckling factor distribution expression such that a power distribution generated by the one dimensional diffusion theory core model, using said distribution expression, for a neutron balance corresponding to the actual neutron balance as represented by the measured values of control rod position, boron concentration, the temperature of reactor coolant entering the core, and reactor power level, agrees, within present tolerances, with the measured core average axial power distribution.

* * * * *